Figure 1:
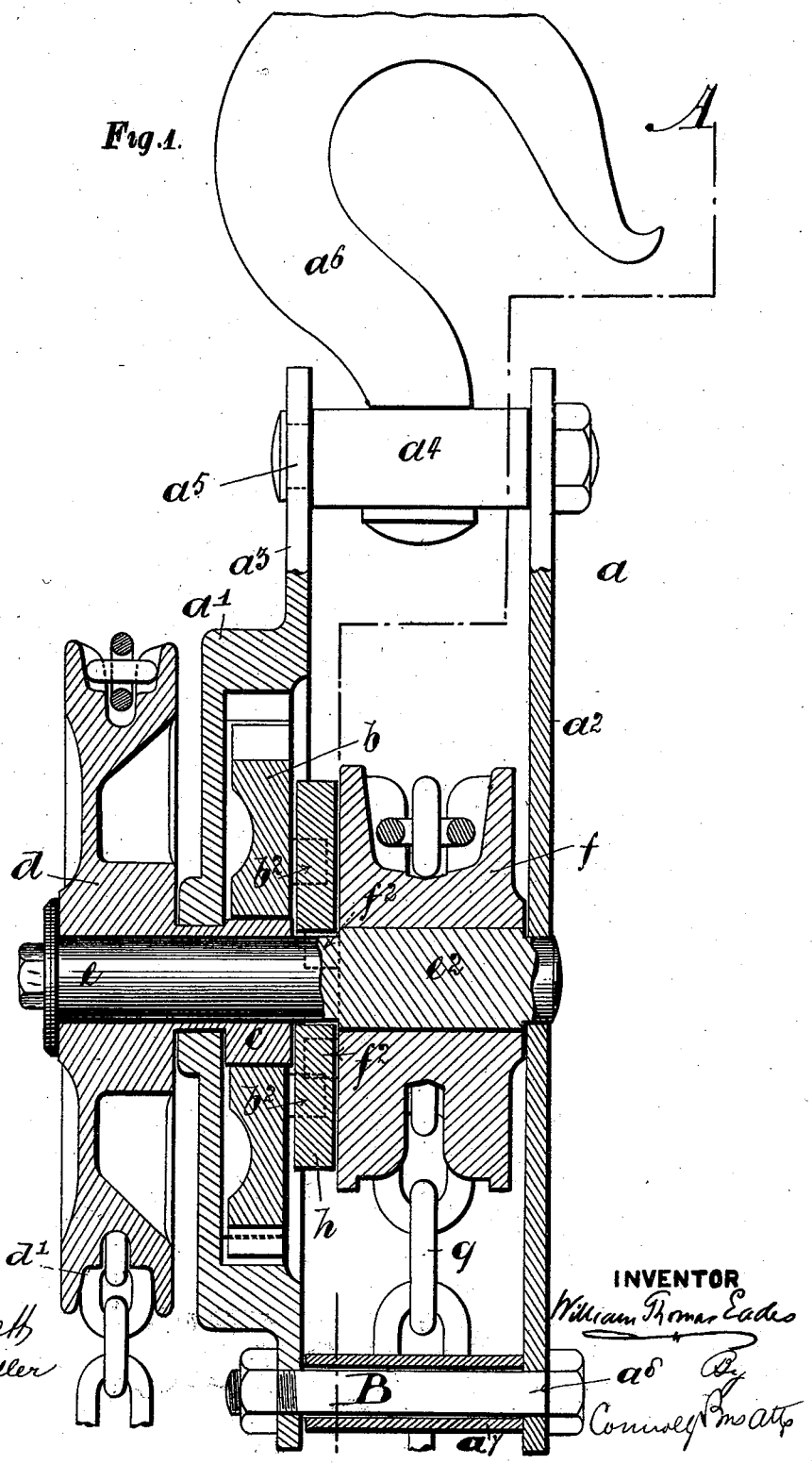

(No Model.) 2 Sheets—Sheet 1.

W. T. EADES.
DIFFERENTIAL PULLEY.

No. 506,166. Patented Oct. 3, 1893.

WITNESSES
Henry Skerrett
Arthur T. Padler

INVENTOR
William Thomas Eades
By Connolly Bros Atty (No Model.) 2 Sheets—Sheet 2.
W. T. EADES.
DIFFERENTIAL PULLEY.
No. 506,166. Patented Oct. 3, 1893.
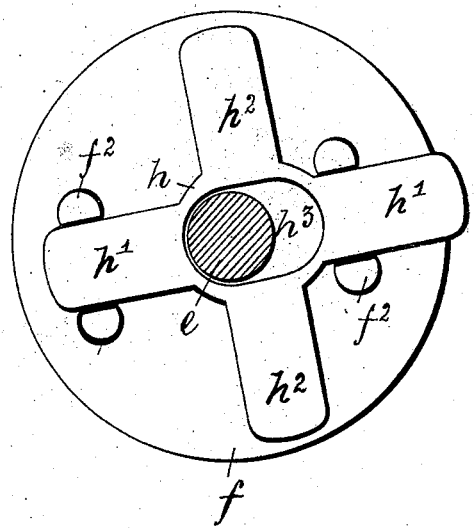
Fig. 2.
Fig. 3.
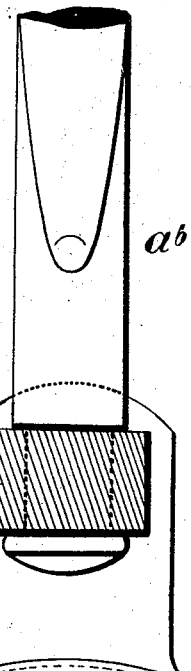
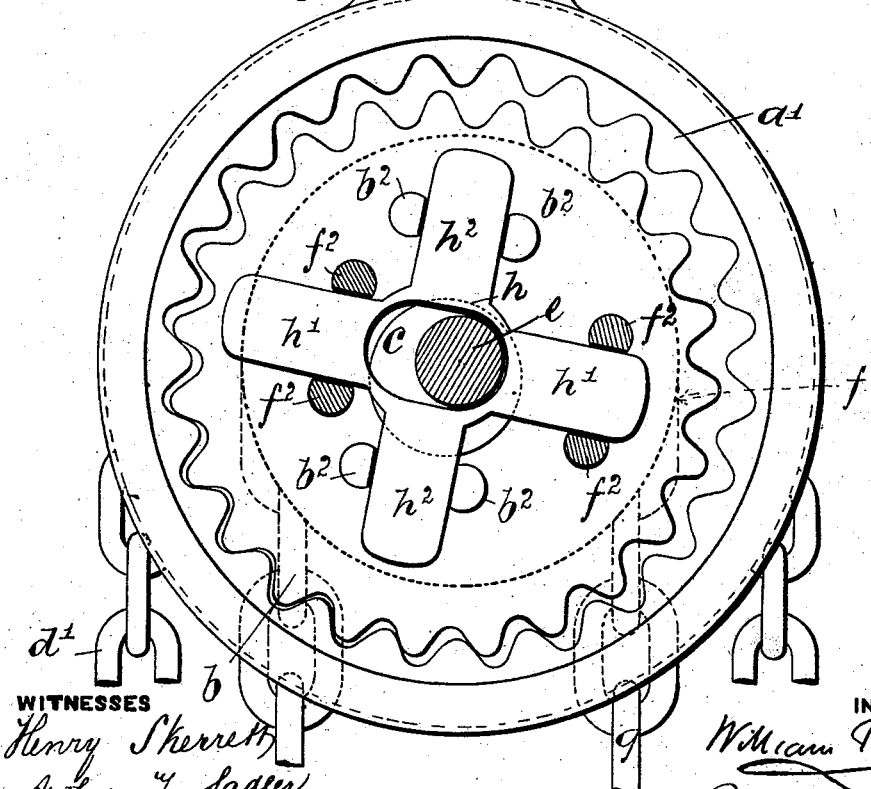
WITNESSES
Henry Sherrett,
Arthur T. Sadler
INVENTOR
William Thomas Eades
By Cornall Bro. atty

UNITED STATES PATENT OFFICE.

WILLIAM THOMAS EADES, OF BIRMINGHAM, ENGLAND.

DIFFERENTIAL PULLEY.

SPECIFICATION forming part of Letters Patent No. 506,166, dated October 3, 1893.

Application filed November 12, 1892. Serial No. 451,812. (No model.) Patented in England July 28, 1892, No. 13,734.

*To all whom it may concern:*

Be it known that I, WILLIAM THOMAS EADES, engineer, a subject of the Queen of Great Britain, residing at 43 Claremont Road, Sparkbrook, in the city of Birmingham, England, have invented certain new and useful Improvements in Differential Pulley-Blocks and Hoists; and I do hereby declare the following to be a full, clear, and exact description of the invention, reference being had to the accompanying drawings, which form part of this specification, and for which invention Letters Patent of Great Britain have been granted to me bearing date the 28th day of July, 1892, No. 13,734.

This invention pertains to differential pulley blocks and hoists, as hereinafter described.

Figure 1 of the accompanying drawings, represents in vertical section, a differential pulley block, having trains of wheels, and constructed, arranged and fitted according to my invention. Fig. 2 represents a transverse vertical section of the said differential pulley block upon the dotted lines A. B. Fig. 1, looking from right to left, or toward the toothed annulus, and inside working toothed wheel, as hereinafter referred to. Fig. 3 represents an elevation of the transmitting coupling, with the lifting pulley and its guides in connection with it.

$a$ is an upright rectangular shaped frame, consisting of sides or cheeks $a^2$, $a^3$, the latter made integral or in one piece with an inside toothed annulus $a'$, with which the teeth of an eccentrically moving inner toothed wheel $b$, mounted upon a cam or eccentric boss $c$, made fast with a driving chain pulley $d$, turning freely upon an axis or shaft $e$, carried by the fixed framing $a$, engage. The head or upper part of the said framing is bolted together by a cross distance block $a^4$, with necks $a^5$, while the block is suspended by a hook $a^6$. The lower parts or sides of the framing are united by a distance sleeve $a^7$, and a bolt $a^8$.

Situated between the sides of the upright frame, and made fast to an enlarged end $e^2$, of the axis $e$, is a lifting pulley $f$, with chain $g$, passing around its link recessed periphery.

Disposed between the lifting wheel $f$, and inner wheel $b$, and turning loosely upon the axis $e$, is a cruciform shaped transmitting coupling $h$, working and located between driving snugs $b^2$, carried by and on the outer face of the eccentrically moving toothed wheel $b$, and driven snugs $f^2$, carried by and on the inner face of the lifting pulley $f$; and which snugs or studs respectively constitute transmitters and guides, for the arms $h'$, $h^2$, of the coupling $h$. Thus the inner toothed wheel which is eccentric in its movement, is mounted upon an eccentric boss or cam, on a turning axis or neck, made fast with the driving or working pulley, which, with the said eccentric boss, works loosely upon the main axis, so that by rotating the said driving pulley by a chain, or other gear, the same freely rotates, and with it, the eccentric boss, which gives an eccentric movement to the inner toothed wheel, whose teeth are brought continuously into mesh or gear with the teeth of the frame or fixed annulus, and as the inner toothed wheel, in this arrangement, has twenty three teeth, and the fixed or frame annulus has twenty four, motion is communicated to the transmitting coupling, and from thence to the lifting pulley, at the rate of one to twenty four. The communication of motion from the inner toothed wheel to the lifting wheel, through the medium of the studs upon them respectively, is performed by the studs $b^2$, on the wheel $b$, which makes a combined reciprocating and rotatory movement, or otherwise an eccentric one, pressing the arms $h^2$, round with it, and as the transmitting coupling or communicator has to traverse with the said wheel, the arms $h'$, are made to slide, and pull round with them the lifting wheel $f$, through the snugs $f^2$, upon its face. The eccentric movement of the said transmitting coupling is permitted by the same being slotted at its middle at $h^3$, so as to clear the same of the axis $e$.

*Action.*—By rotating the chain driving pulley, by the chain $d'$ the eccentric boss is rotated, which gives unto the inner toothed wheel, a planetary movement within the sinking of the fixed annulus, and with the teeth of the last named acting as fulcra for giving the rotary movement to the teeth of the inner wheel, as the same is made to travel in the eccentric or planetary course as indicated. By this means the said inner wheel is rotated in one whole traverse of the teeth of the annulus to the extent of one tooth, or to one twenty fourth of the number of the teeth of the fixed wheel, or to one twenty-fourth part of the motion made by the driving wheel. The reduced speed is communicated to the transmitting coupling or communicator, by the snugs or studs on the inner toothed wheel, and from the coupling to the lifting wheel through the snugs or lugs on its face.

The application of my invention to hoists and lifts, differs in no essential respect from its application to a pulley block as herein described.

Having fully described my invention, what I desire to claim and secure by Letters Patent is—

In differential pulley blocks, the combination with the fixed frame having a toothed annulus, of a shaft journaled in said frame, a lifting pulley fixed on said shaft and having laterally projecting studs, a cruciform coupling engaged by said studs, a driving pulley loosely mounted on the said shaft and having an eccentric boss, an eccentrically moving toothed wheel mounted on said boss, and provided with laterally projecting lugs engaging with the cruciform coupling substantially as described.

In testimony that I claim the foregoing I have hereunto set my hand this 6th day of October, 1892.

WILLIAM THOMAS EADES.

Witnesses:
HENRY SKERRETT,
ARTHUR T. SADLER,
  *Both of Birmingham.*